March 19, 1968  J. A. SAFFIR  3,374,353
DENTAL X-RAY FILM PACKAGE WHEREIN A PROJECTION
OF THE X-RAY FILM EXTENDS OUTSIDE THE WRAPPER
Filed July 12, 1965  2 Sheets-Sheet 1
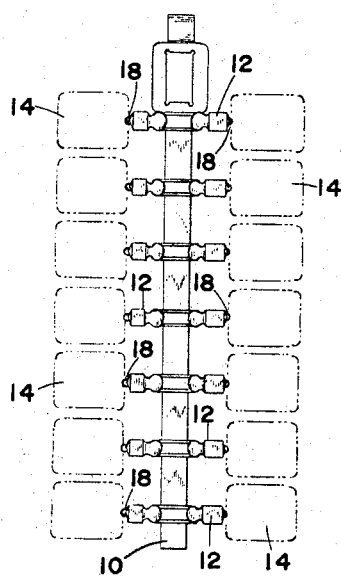
FIG. 1
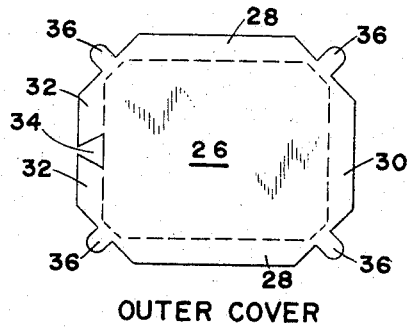
OUTER COVER
FIG. 4
FILM PER SE
FIG. 3
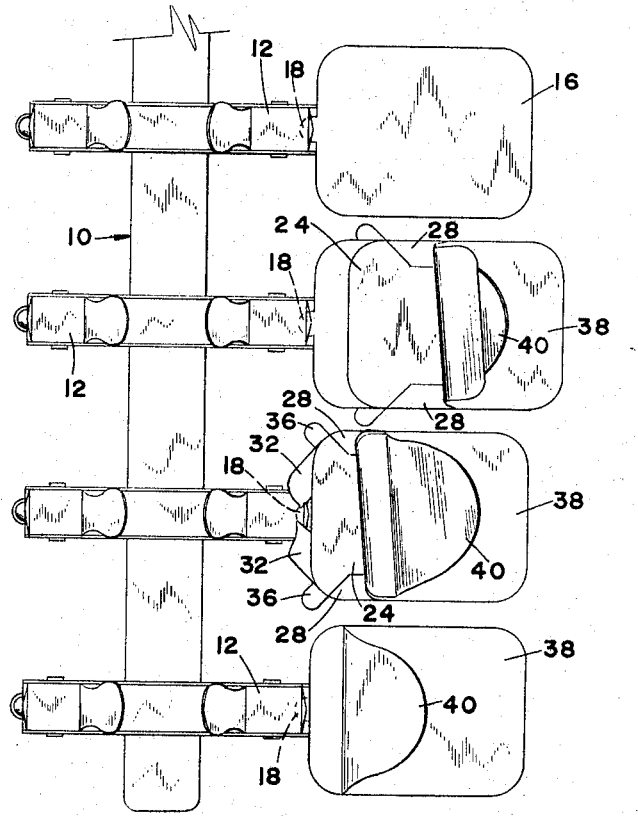
FIG. 2
INVENTOR.
JACOB A. SAFFIR March 19, 1968

J. A. SAFFIR 3,374,353

DENTAL X-RAY FILM PACKAGE WHEREIN A PROJECTION
OF THE X-RAY FILM EXTENDS OUTSIDE THE WRAPPER

Filed July 12, 1965

INVENTOR.
JACOB A. SAFFIR

BY
ATTORNEY

United States Patent Office 3,374,353
Patented Mar. 19, 1968

3,374,353
DENTAL X-RAY FILM PACKAGE WHEREIN A PROJECTION OF THE X-RAY FILM EXTENDS OUTSIDE THE WRAPPER
Jacob A. Saffir, Los Angeles, Calif., assignor to The Dentists' Supply Company of New York, York, Pa., a corporation of New York
Filed July 12, 1965, Ser. No. 471,267
9 Claims. (Cl. 250—69)

ABSTRACT OF THE DISCLOSURE

A dental X-ray film package comprising a sensitized X-ray film having a supporting member projecting from one edge thereof, a light-proof container enclosing said film in a manner to render said supporting member unobstructed for engagement by a clip of a film rack, and said container readily being separable from said film while said supporting member is clipped to said rack.

This invention relates generally to X-ray film packages and the like and more particularly to dental X-ray film packages.

The ordinary dental X-ray film package consists of a paper or plastic envelope enclosing an ensemble consisting of a suitable sensitized film, a thin layer of lead, sheets of black paper on each side of the film for protection from abrasion by the lead on the one side of the film and for added protection against fogging from stray light on the other.

When the above-described film has been exposed and is ready to be developed, it is taken to the darkroom where the outer envelope is removed, the film is freed from the black paper and lead, and where each film singly is secured by clips to a conventional processing and drying rack. In the darkroom, the rack full of films is immersed in a developer solution, a fixing solution, and then is washed in water.

The difficulties inherent in handling and separating all these layers in the dark where the sense of touch becomes even more important than sight, result in frequent mishandling and errors through misarrangement on the rack and otherwise.

By way of example, of the latter, the slightest movement of the edges of the lead across the film may mar it. Also, one of the black paper sheets is often mistaken to be the film and is mounted on the rack while the film itself is discarded.

An orderly procedure of handling the films includes mounting them in a logical and regular arrangement upon the rack, in the sequence in which they are taken but during the manipulations in the darkroom, the lower left third molar region, for example, often becomes placed other than on the extreme lower left of the rack where a dentist is accustomed to look for it.

To properly position the films later means looking them over, verifying them, reattaching them, all of which takes additional time and possible damage to the films but all of which is necessary for the final mounting in the patient's folder since there is a regular sequence for mounting dental X-ray film for efficient use.

A principal object of the present invention is to make it possible to mount exposed film packets in their proper sequence on an X-ray film holder in an operatory, for example, outside the darkroom to insure proper sequential arrangement prior to developing a set of such films.

Another object is to provide a light-proof envelope for the X-ray film which lends itself to removal from an exposed film in such a way as not to rearrange the film or disturb its mounted position upon the X-ray film holder.

Still another object of the invention is to provide means which assure the mounting of the exposed films in the correct sequence thereof on the film holder and not permit an error such as mounting a layer of paper or lead upon the rack rather than the exposed film, and also support the films, per se, for processing without changing said mounting.

A further and important object is to make it possible to avoid the touching or handling of the exposed film and reduce to a minimum the possibility of soiling or damaging the X-ray picture due to the present invention providing for the packet only being handled, whereas in the prior art, not only is the packet handled but also the film as when it is to be extracted from its wrappings and fastened into position on the rack for processing.

Still another object of the invention is to eliminate a number of steps that heretofore have been necessary in the darkroom procedure before the films are mounted and ready to be developed, whereby time is saved which can be especially important where the doctor must interrupt his work until he studies the developed X-ray picture.

In general, it is the primary object of the present invention to provide an X-ray film package of such construction or form as to overcome all the aforementioned difficulties and disadvantages by utilizing a light-proof film packet which is capable of permitting ready removal of the outer envelope by having a projection on the film per se which is directly engaged by a clip on the film rack, whereby the main portion of the bare, exposed film is positioned accurately on the rack and is ready for processing.

The attachment of the above and further objects of the present invention will be apparent from the following description when taken in conjunction with the accompanying drawings forming a part thereof.

FIG. 1 is a plan view of a conventional X-ray film rack having attached thereto several series of X-ray films which are illustrated in phantom.

FIG. 2 is an enlarged fragmentary view of a portion of the rack and some of the films shown in FIG. 1, the films being illustrated in progressive stages of having the film enclosure removed from the film per se.

FIG. 3 is a plan view of the film sheet per se of the type illustrated in FIG. 2.

FIG. 4 is a plan view of the outer cover for the film sheet shown in FIG. 3 and also as illustrated in FIG. 2.

Figure 5:
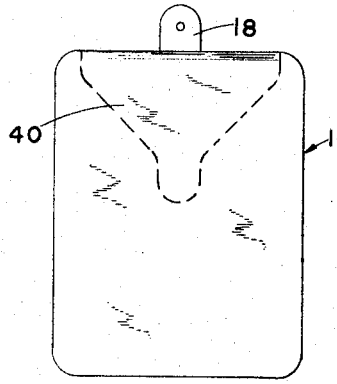
Figure 6:
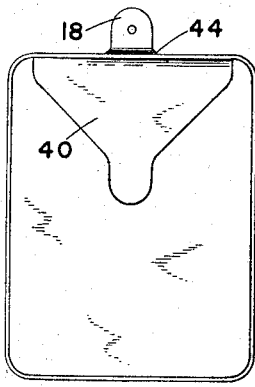

FIGS. 5 and 6 respectively are rear and front face views of an X-ray film package containing a film sheet embodying the principles of the present invention.

Figure 7:
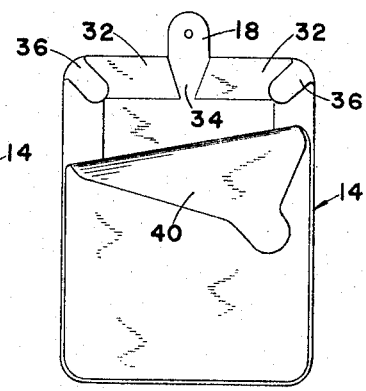

FIG. 7 is a view similar to FIG. 6 but showing the front sheet of the cover of the X-ray film partially removed.

Figure 8:
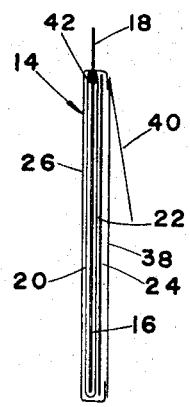

FIG. 8 is a longitudinally extending sectional view through the midportion of the film package shown in FIG. 6 and illustrating one embodiment of sealing means around the tab end of the film sheet.

Figure 9:
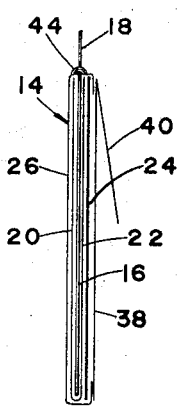

FIG. 9 is a view similar to FIG. 8 but illustrating another embodiment of sealing means.

Figure 10:
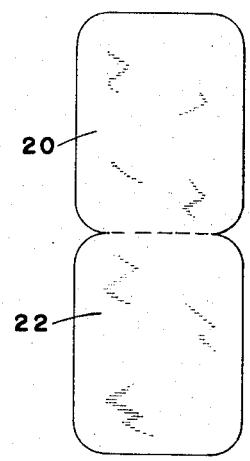

FIG. 10 is a plan view of a foldable sheet of masking paper which is folded around opposite surfaces of the film sheet as illustrated in FIGS. 8 and 9.

Figure 11:
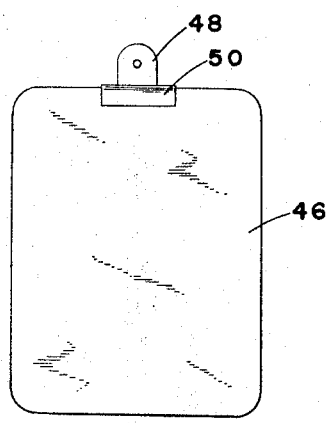
Figure 12:

FIGS. 11 and 12 respectively are face and side elevations of another embodiment of film sheet to which a separately-formed tab is applied.

Referring to the drawings, there is illustrated in FIG. 1 a conventional film rack 10 having a plurality of clips 12 projecting from opposite sides thereof, each being arranged to hold a separate X-ray film package 14. The conventional X-ray film package or unit as presently manufactured comprises a small, rectangular sheet of synthetic resin which is sensitized and usually has rounded corners, a folded sheet of black paper extending along the entire opposite surfaces of the film sheet, a thin sheet of lead extending along the coextensive with one of the folded panes of black paper, and an outer wrapper comprising a fairly heavy sheet of paper disposed over the surface of the above-described assembly opposite that along which the sheet of lead extends, said paper sheet having marginal edges which are folded around the edges of the assembly and onto the opposite surface thereof for application of a final, cover sheet which is cemented or otherwise affixed to the folded edges of the first-mentioned sheet and is provided with a pull-tab to facilitate removal of the paper cover from the assembly.

When these X-ray film packages are exposed to X-rays, said rays readily penetrate the paper elements of the package and react with the sensitized coating on the sheet of synthetic resin film, it being understood that the X-rays are applied to the side of the film opposite that along which the sheet of lead extends, the sheet of lead serving as a barrier against the passage of X-rays into the oral cavity. After the X-ray film package has been subjected to X-rays, it is developed in a conventional darkroom in which it is necessary to remove all of the wrapping elements and sheet of lead from the exposed sheet of film and then process the film in a conventional manner. After the film is processed, it is attached to one of the clips 12 of the film rack 10 and permitted to dry. Usually it is inspected by the dentist in this condition prior to the films being mounted in appropriate sequential order in a viewing holder or card.

It readily can be appreciated from the foregoing that there is not only a ready possibility of misarranging the films from the sequence in which they were taken, but, indeed, it is difficult to avoid such misarrangement and frequently substantial study is required to determine the correct sequence of the films, particularly where the entire sets of both upper and lower teeth of a patient are X-rayed for study. Also, it is conceivable that the films can be somewhat damaged in carelessly clipping the same to the rack 10 as well as during the removal of the wrapping elements and lead sheets from the film incident to freeing the film sheets per se for processing as well as during the handling of the film while being processed.

In accordance with the present invention, a preferably conventional size of X-ray film 16, formed from synthetic resin or the like and suitably sensitized, is provided with an integral ear or tab 18 of effective size to be engaged by the jaws of the clips 12 of a conventional X-ray film rack 10. By referring particularly to FIGS. 8 and 9, which are longitudinally sectional views of an X-ray film package made in accordance with the invention, a folded sheet of black paper comprising panels 20 and 22 is disposed around the main body sheet of the film, the panels 20 and 22 respectively being adjacent opposite surfaces thereof to protect the same against possible exposure from incident light, as well as damage by the engagement of the lead sheet 24 which is disposed against the outer surface of one of the panels of black paper, the lead sheet being substantially coextensive in area with the film body sheet.

An outer cover, preferably formed of paper of reasonable thickness and opacity encloses the laminated assembly described above. Said cover comprises a main cover sheet 26, the preferred outline of which, in plan view, is shown in FIG. 4. The central portion of said cover sheet is substantially coextensive in area with the X-ray film 16 and, foldable along the dotted lines illustrated in FIG. 4, are edge flaps 28 and 30 respectively on the opposite sides and one end thereof, while, at the other end, a pair of edge flaps 32 are utilized in order to provide a space 34 therebetween, for purposes to be described. Further, at each corner is a corner flap 36.

The main cover sheet 26 is disposed against one of the panels, such as panel 20 of like paper, thereby being on the opposite of the film from the lead sheet 24, and all of the edge flaps are folded over the corresponding edges of the laminated assembly described above, the smaller edge flaps 32 respectively being disposed on opposite sides of the ear 18 of the X-ray film 16, which ear is accommodate, quite precisely, by the space 34. After the aforementioned edge flaps have been folded against the corresponding edges of the lead sheet 24, the corner flaps 36 are then folded so as to overlie the abutting edges of the edge flaps and thus effectively insure the obscuring of light from the enclosed X-ray film 16. All of the folded edge and corner flaps then are secured in folded condition by applying what is designated as a front cover sheet 38 over the lead sheet 24 and the outer surfaces of the edge flaps and corner flaps just described and to which the front cover sheet 38 is secured by suitable adhesive, cement, or the like. In the preferred embodiment of the invention, however, a cement is selected which will hold the assembled cover sheets in enclosed manner around the film and other laminated elements but will not unduly prevent fairly easy separation of the front cover sheet from the edge and corner flaps of the main cover sheet 26 in order to readily effect removal of the entire covering assembly of the X-ray film 16 in the manner to be described. It is to be understood that the adhesion of the front cover sheet 38 to the folded flaps is adequate to render the completed package light-proof.

To facilitate the aforementioned removal, the front cover sheet 38, which essentially is coextensive in area with the X-ray film 16, has a pull tab 40 folded over upon the sheet 38 from one end thereof. As seen particularly from FIGS. 8 and 9, the pull tab 40 is disposed on the face of the package 14 which is closest to the lead sheet 24. Hence, said pull tab also serves as an identifying means as to the service of the film package which is to be mounted within the oral cavity away from the nose of the X-ray machine, whereby the lead sheet 24 will prevent the passage of X-rays through the film package 14 and into contact with the tissues of the oral cavity beyond the film package.

The employment of a supporting ear 18 upon the X-ray film 16 for purposes of being held by one of the clips 12 of the rack 10 presents problems which do not exist in the conventional X-ray film package wherein no supporting projection of any kind is provided on the X-ray film. This problem concerns the preventing of the passage of light through the enclosing cover means for the film in the region where the ear 18 projects through the cover of the package 14. This problem is solved in several ways. One of these is illustrated in the embodiment shown in FIG. 8, in which a small saddle member, formed from black paper or the like, similar to the panels 20 and 22, is U-shaped in cross-section and provided with a slot in the bight of the saddle member which precisely receives the ear 18 of the X-ray film 16. Particularly when the narrow flaps 32 of the main cover sheet 26 are folded around the opposite edges of the ears 18, they closely conform the opposite sides of the U-shaped saddle member 42 to the adjacent end edges of the black paper panels 20 and 22 and effectively obscure the film which is enclosed within the package 14 from contact by surrounding light.

Another embodiment of light-sealing means relative to the ear 18 is illustrated in FIG. 9, wherein after the formation of the package 14 has been completed, opposite sides of the base of the ear 18 may have suitable sealing means, such as wax, plastic cement, or the like, applied thereto, as indicated at 44, to bar the passage of light into the package 14 at this area. Further, ear 18 may be entirely coated with suitable light-proof material, such as paint or lacquer, to prevent the transmission of light through the ear to the sensitized coating of the film.

A further embodiment of X-ray film is illustrated in FIGS. 11 and 12, wherein a conventional panel 46 of X-ray film per se is provided with a separately-formed ear or tab 48 which may be formed, for example, from metal, synthetic resin, or the like, in such manner as to be provided with a suitable attaching channel 50 which, for example, may be secured to the film 46 by cement or any other appropriate means. This embodiment of film having a separately-formed ear 48 applied thereto readily may be packaged as described above with respect to the X-ray film 16 in the first-described embodiment.

The preferred manner of employing the present invention comprises exposing the X-ray film within the packages 14 to X-rays while disposed within the oral cavity, in the same manner in which conventional X-ray film packages are exposed thereto. However, particularly when it is desired to take a complete set of X-rays of the mouth and all the teeth of a patient, including both the upper and lower teeth, it will be assumed that the dentist will commence taking the X-rays of the rearmost or posterior teeth of the patient, either the upper or lower, and then gradually work around toward the front or anterior teeth, concluding the taking of the X-rays of either the upper or the lower set of teeth, for example, with the rearmost teeth at the opposite side of the mouth. Usually, a set of X-rays of a complete complement of natural teeth, either the upper or lower, comprises a set of about 7 X-rays and it will be seen from FIG. 1 that the rack 10 accommodates a set of 7 X-ray film packages 14 upon each side thereof.

As each of the X-ray film packages 14 are exposed to X-rays, and removed from the mouth, the ears 18 of the tabs are mounted within the clips 12, in successive order. When the complete set of X-rays has been "shot," and especially if both the upper and lower sets of teeth are X-rayed, the rack 10 will be completely filled with exposed X-ray film packages 14, those of the lower set of teeth being on one side of the rack and those of the upper set of teeth being on the opposite side of the rack. By such procedure, the dentist is assured that the exposed X-ray films are arranged in the correct order in which they were taken and there is no requirement to fumble with the films or run the risk of rearranging them since all of such placement of the films in the rack is done under conditions of normal room light rather than those of the darkroom where substantially no light is available and the sense of touch has to be relied upon almost entirely.

The next step in the operation of completing the X-rays to develop the image on the X-ray films, regardless of whether the rack 10 is filled with exposed X-ray film packages or less than the full complement are mounted thereon, is to take the rack of exposed film packages into the darkroom and it is then that the principal benefits of the invention become evident due to the following procedure.

When the rack of films is in the darkroom, the entire packaging assembly on each X-ray film 16 per se quickly is removed therefrom, especially by holding the rack 10 in one hand and successively engaging the pull tabs 40 of the front cover sheets 38 of each package to partially separate the same from the edge flaps 32 and at least one end portion of each of the side edge flaps 28, as shown with respect to the package which is second from the bottom in the showing of FIG. 2. Then, by grasping the side edges of the film package, it is evident that the narrow edge flaps 32 and the exposed corner flaps 36 will be forced into flattened condition by gently pulling upon the partially disassembled elements of the covering part of each package, so that the package then assumes the further withdrawn position shown in the third figure from the bottom in the showing of FIG. 2, following which complete removal of the package is easily accomplished, leaving the completely exposed X-ray film 16 per se as shown in the uppermost film position shown in FIG. 2. This procedure is continued for each of the exposed X-ray film packages 14 which are clipped to the rack 10, following which all of the undeveloped but exposed X-ray films 16 are ready for processing in the various baths to which they are subjected to develop the images created thereon upon being exposed to X-rays.

During all of the processing described above, in accordance with the intentions and preferred procedure of the present invention, the ears 18 are never unclipped from the rack 10, whereby after the developed films have dried, they are ready for viewing. Frequently such viewing even takes place while the films are still slightly wet from the final washing, but the images, nevertheless, have become fixed so that the dentist may ascertain tooth conditions in which he is interested in order that he may proceed with his operatory functions.

After the complete developing of all of the X-ray films 16 which are clipped to the rack 10, it will be seen that they are maintained in the exact order upon the rack in which they initially were placed thereon since they have never been unclipped therefrom during the entire procedure outlined above. Accordingly, the films then are ready to be mounted permanently into appropriate paper holders or racks capable of supporting an entire set of X-rays of both the upper and lower teeth of an individual patient, or less than a full complement of teeth if desired, whereby such X-rays become a permanent record of reasonable durability.

From the foregoing, it will be seen that the present invention, especially in providing several different embodiments of ears or tabs 18 by which the exposed but undeveloped X-ray film packages 14 may be secured to a conventional X-ray film rack 10, the entire development procedure quickly and efficiently may be undertaken with minimum possibility of damage to the film and while being assured of the films remaining in successive order, especially where sets of X-rays are taken of either a full complement or substantially a full complement of either the upper or lower teeth of a patient. The cost of providing this additional benefit is extremely minimum, yet the benefits resulting therefrom add most substantially to the efficiency of practicing X-ray techniques of a dental nature.

While the invention has been described and illustrated in its several preferred embodiments, it should be understood that the invention is not to be limited to the precise details herein illustrated and described since the same may be carried out in other ways falling within the scope of the invention as claimed.

I claim:

1. A dental X-ray film package comprising in combination, a substantially flat sheet-like X-ray sensitive film having a full useful area bounded by all edges thereof, a projection of the same material as said film integral with and extending beyond one edge thereof and arranged to be clamped by a clip of a dental film developing rack, a light-proof wrapper enclosing all of said film except said projection which extends beyond said wrapper, said wrapper comprising light-proof members secured releasably together for ready removal from said film without contacting said film and while said projection thereon is secured to said clip of said rack, and tab means on one of said light-proof members of said wrapper operable to be pulled while the film package is clamped by said projection to a film rack to at least initiate separation of said members of said wrapper to facilitate removal thereof from said film.

2. The dental X-ray film package according to claim 1 in which said wrapper has portions surrounding said projection closely around the end thereof adjacent said film to prevent the passage of light into said wrapper in the vicinity of said projection.

3. The dental X-ray film package according to claim 1 in which said projection comprises an ear of substantially less width than the edge of the film to which it is connected.

4. Then dental X-ray film package according to claim 3 in which said light-proof wrapper members are coextensive in area with said film and extend across opposite surfaces thereof to enclose the film, and means connecting said sheets together adjacent the edges thereof, said connecting means being readily releasable relative to the edges of the cover sheets adjacent the edge of the film from which said ear extends.

5. A dental X-ray film package comprising in combination, a sensitized sheet of X-ray film having an ear of said film material integral with and projecting from one edge thereof for engagement by the clip of a film developing rack, a light-proof enclosure completely enveloping said film except said ear thereof, said ear projecting freely in exposed condition beyond the adjacent edge of said enclosure, and means connected to said adjacent edge of said enclosure operable to be pulled to open said edge thereof from which said ear projects sufficiently to permit said film to be slidably removed through said opened edge of said enclosure while said ear is clipped to a developing rack.

6. The dental X-ray film package according to claim 5 in which said enclosure at least at the edge thereof adjacent said ear comprises cover sheets respectively overlying the opposite surfaces of said film and the edges of said cover sheets adjacent said ear being separable to effect opening of said edge of said enclosure to permit removal of said film from said enclosure.

7. The dental X-ray film package according to claim 6 in which one of said cover sheets is provided with a pull tab attached to the end of said sheet adjacent said ear and operable to facilitate opening the end of said enclosure through which said ear projects.

8. The dental X-ray film package according to claim 7 in which the edge of the other of said cover sheets adjacent said ear has flaps at opposite sides of said ear closely conforming thereto and folded over the adjacent edge of the film and releasably secured to the adjacent edge of said one of said cover sheets for separation therefrom when said pull tab is pulled to effect such separation.

9. The dental X-ray film package according to claim 6 further including light-inhibiting means surrounding said projecting ear to insure against the passage of light rays past said ear and thereby prevent the film enclosed within said package from being contacted by such light rays.

References Cited

UNITED STATES PATENTS

| | | | |
|---|---|---|---|
| 1,437,827 | 12/1922 | Sulzer et al. | 250—69 |
| 2,974,229 | 3/1961 | Schmidt et al. | 250—69 |
| 3,152,252 | 10/1964 | Wainwright et al. | 250—69 X |

WILLIAM F. LINDQUIST, *Primary Examiner.*